(12) United States Patent
Lafleur

(10) Patent No.: US 11,667,165 B1
(45) Date of Patent: Jun. 6, 2023

(54) SYSTEM, METHOD AND APPARATUS FOR MULTI-ZONE CONTAINER MONITORING

(71) Applicant: ORBCOMM, INC., Rochelle Park, NJ (US)

(72) Inventor: Phil Lafleur, Ontario (CA)

(73) Assignee: ORBCOMM INC., Rochelle Park, NJ (US)

( * ) Notice: Subject to any disclaimer, the term of this patent is extended or adjusted under 35 U.S.C. 154(b) by 0 days.

(21) Appl. No.: 17/489,606

(22) Filed: Sep. 29, 2021

Related U.S. Application Data

(60) Provisional application No. 63/084,660, filed on Sep. 29, 2020.

(51) Int. Cl.
*G08B 21/00* (2006.01)
*B60D 1/62* (2006.01)
*B60Q 11/00* (2006.01)

(52) U.S. Cl.
CPC ............... *B60D 1/62* (2013.01); *B60Q 11/00* (2013.01)

(58) Field of Classification Search
CPC ................................. B60D 1/62; B60Q 11/00
See application file for complete search history.

(56) References Cited

U.S. PATENT DOCUMENTS

| | | | | |
|---|---|---|---|---|
| 5,479,152 A * | 12/1995 | Walker | ............... | F25D 29/008 200/61.81 |
| 5,873,597 A * | 2/1999 | Sim | ............... | B60R 21/01534 280/727 |
| 5,913,180 A * | 6/1999 | Ryan | ............... | G06Q 50/06 705/413 |
| 5,917,433 A * | 6/1999 | Keillor | ............... | G08G 1/20 340/7.37 |
| 5,959,568 A * | 9/1999 | Woolley | ............... | G01S 13/878 340/568.1 |
| 5,999,091 A * | 12/1999 | Wortham | ............... | G08G 1/20 340/10.2 |
| 6,236,911 B1 * | 5/2001 | Kruger | ............... | G06K 7/0008 701/1 |
| 6,254,201 B1 * | 7/2001 | Lesesky | ............... | B60T 8/1708 303/122.02 |
| 6,281,793 B1 * | 8/2001 | Haimovich | ............... | G09F 3/0352 340/542 |
| 6,491,516 B1 * | 12/2002 | Tal | ............... | A47G 33/00 446/175 |

(Continued)

OTHER PUBLICATIONS

Ryszard Miler, Electronic Container Tracking System as a Cost-Effective Tool in Intermodal and Maritime Transport Management (Year: 2015).*

(Continued)

*Primary Examiner* — Quang Pham

(57) ABSTRACT

The present invention preferably includes a monitoring device which is able to monitor both signals from the cab and the contents of a trailer/container. According to a preferred embodiment, the monitoring device may transmit monitoring signals (i.e., RF, ultra-sonic, IR) within the trailer/container and receive responsive signals/feedback indicating the status of the container interior. According to preferred embodiments, the monitoring device of the present invention may preferably receive data/signals from sensors internal to the container.

14 Claims, 14 Drawing Sheets

(56) References Cited

U.S. PATENT DOCUMENTS

| | | | | |
|---|---|---|---|---|
| 6,512,455 B2* | 1/2003 | Finn | ............... | H04B 1/7183 340/572.1 |
| 6,608,554 B2* | 8/2003 | Lesesky | ............... | G08G 1/017 340/944 |
| 6,679,071 B1* | 1/2004 | Storey | ............... | F25D 29/003 236/51 |
| 6,744,352 B2* | 6/2004 | Lesesky | ............... | B60R 16/0315 340/933 |
| 6,747,558 B1* | 6/2004 | Thorne | ............... | G09F 3/0329 340/568.1 |
| 6,753,775 B2* | 6/2004 | Auerbach | ............... | G06K 19/07798 340/539.22 |
| 6,844,829 B2* | 1/2005 | Mayor | ............... | G08B 25/14 341/27 |
| 6,870,476 B2* | 3/2005 | Cockburn | ............... | B60R 25/102 340/568.1 |
| 6,919,803 B2* | 7/2005 | Breed | ............... | G08B 13/2462 340/568.1 |
| 6,927,688 B2* | 8/2005 | Tice | ............... | G06K 7/10306 340/539.1 |
| 6,975,224 B2* | 12/2005 | Galley, III | ............... | G06Q 10/087 340/539.18 |
| 7,034,683 B2* | 4/2006 | Ghazarian | ............... | G08B 13/06 340/568.1 |
| 7,098,784 B2* | 8/2006 | Easley | ............... | G06Q 10/08 340/539.1 |
| 7,333,015 B2* | 2/2008 | Ekstrom | ............... | G08B 21/0286 70/257 |
| 7,564,350 B2* | 7/2009 | Boman | ............... | H04Q 9/00 340/541 |
| 8,310,363 B2* | 11/2012 | Breed | ............... | B60N 2/28 340/539.22 |
| 9,846,086 B1* | 12/2017 | Robinson | ............... | G01K 3/04 |
| 10,073,451 B2* | 9/2018 | Dotzler | ............... | G05D 1/0022 |
| 10,093,232 B2* | 10/2018 | Troutman | ............... | B60T 17/221 |
| 10,118,576 B2* | 11/2018 | Breed | ............... | B60N 2/015 |
| 10,679,173 B2* | 6/2020 | Olsen | ............... | H04W 4/029 |
| 2003/0169183 A1* | 9/2003 | Korepanov | ............... | G07F 17/246 340/932.2 |
| 2004/0069850 A1* | 4/2004 | De Wilde | ............... | G06K 19/07758 235/385 |
| 2004/0113783 A1* | 6/2004 | Yagesh | ............... | G07C 9/27 340/568.1 |
| 2004/0174259 A1* | 9/2004 | Peel | ............... | G07C 5/008 340/539.26 |
| 2004/0183673 A1* | 9/2004 | Nageli | ............... | G08G 1/20 340/8.1 |
| 2004/0233041 A1* | 11/2004 | Bohman | ............... | G06Q 10/08 340/10.33 |
| 2005/0046567 A1* | 3/2005 | Mortenson | ............... | G07C 9/00 340/541 |
| 2005/0134457 A1* | 6/2005 | Rajapakse | ............... | G08B 13/2462 340/545.6 |
| 2005/0179545 A1* | 8/2005 | Bergman | ............... | G08B 25/10 340/539.1 |
| 2006/0012481 A1* | 1/2006 | Rajapakse | ............... | G06Q 10/00 340/572.1 |
| 2007/0008107 A1* | 1/2007 | Farrell | ............... | G06Q 10/08 340/539.1 |
| 2007/0040647 A1* | 2/2007 | Saenz | ............... | H04W 4/40 340/3.1 |
| 2007/0267509 A1* | 11/2007 | Witty | ............... | G01D 9/007 236/51 |
| 2008/0270076 A1* | 10/2008 | Breed | ............... | G06F 3/0233 702/185 |
| 2009/0237258 A1* | 9/2009 | Heck | ............... | H04Q 9/00 340/585 |
| 2010/0024450 A1* | 2/2010 | Waldschmidt | ............... | F25D 29/003 62/115 |
| 2010/0127867 A1* | 5/2010 | Chien | ............... | B60C 23/009 340/447 |
| 2011/0221573 A1* | 9/2011 | Huat | ............... | F25D 29/003 340/10.1 |
| 2011/0260848 A1* | 10/2011 | Rodriguez Barros | . | B60Q 1/324 340/438 |
| 2012/0018652 A1* | 1/2012 | Yoder | ............... | G01T 1/10 250/483.1 |
| 2013/0271290 A1* | 10/2013 | Saenz | ............... | G05D 27/02 340/870.07 |
| 2013/0298575 A1* | 11/2013 | Stark | ............... | B65D 88/74 62/125 |
| 2014/0225744 A1* | 8/2014 | Claris | ............... | B65D 90/008 428/106 |
| 2016/0214551 A1* | 7/2016 | Armacost | ............... | B60D 1/36 |
| 2016/0221403 A1* | 8/2016 | Uh | ............... | B60C 23/009 |
| 2016/0260059 A1* | 9/2016 | Benjamin | ............... | G06Q 10/0833 |
| 2018/0137071 A1* | 5/2018 | Sturm | ............... | G06F 13/374 |
| 2018/0220665 A1* | 8/2018 | Savur | ............... | A23B 7/152 |
| 2018/0300675 A1* | 10/2018 | Arena | ............... | G07C 9/00182 |
| 2018/0347895 A1* | 12/2018 | Jonsson | ............... | F25D 29/008 |
| 2019/0066504 A1* | 2/2019 | Zaloom | ............... | G08G 1/144 |
| 2019/0114714 A1* | 4/2019 | Jones | ............... | H04W 4/026 |
| 2019/0250653 A1* | 8/2019 | Conlon | ............... | G06Q 10/0832 |
| 2020/0073398 A1* | 3/2020 | Niewiadomski | ............... | B60D 1/62 |
| 2020/0132835 A1* | 4/2020 | Han | ............... | B62D 15/0233 |
| 2020/0172060 A1* | 6/2020 | Decker, Jr. | ............... | B60T 7/20 |
| 2020/0247200 A1* | 8/2020 | Ferrer | ............... | H04W 4/44 |
| 2021/0053407 A1* | 2/2021 | Smith | ............... | B25J 9/1697 |
| 2021/0342806 A1* | 11/2021 | Meidar | ............... | G06Q 30/06 |

OTHER PUBLICATIONS

Yingjun et al., Shipping containers of dangerous goods condition monitoring system based on wireless sensor network (Year: 2010).*

* cited by examiner

SYSTEM, METHOD AND APPARATUS FOR MULTI-ZONE CONTAINER MONITORING

RELATED APPLICATIONS

The present application claims priority to U.S. Provisional Application No. 63/084,660 filed Sep. 29, 2021.

BACKGROUND OF THE PRESENT INVENTION

1. Field of the Present invention

The present invention relates to an apparatus and system for securing and monitoring cargo containers.

2. Description of Related Art

Modern telematics systems allow companies to track shipping containers in real-time, through virtually every point of the distribution system. However, the vast majority of container tracking is limited to the outside of the container. For this reason, container owners and authorities are unable to truly monitor assets during transportation.

A key impediment to monitoring the inside of a shipping container is the metal surface of the container itself. During transport, each shipping container is sealed thus making reliable RF communications from within each metal container limited. Prior art systems have attempted to solve this problem a number of different ways. These systems, however, have proven to be impractical for several reasons. For example, prior art systems have attempted to attach repeaters and other devices to the outside of shipping containers. These devices have been damaged due to impacts encountered during transport. Additionally, prior art systems have attempted to retrofit shipping container walls with holes and internal wiring. With fleets of thousands of containers, these retrofits have been impractical to implement for most operators. Still further, where actually implemented, these devices have been poor at monitoring the full volume of a shipping container because of the small holes they are restricted to using.

To overcome the limitations of the prior art, a novel device is needed which allows for rapid install, full coverage of a shipping container interior and reliable communications to outside services.

SUMMARY OF THE PRESENT INVENTION

To address the shortcomings presented in the prior art, the present invention provides a system, method and apparatus for monitoring the interior of a shipping container or similar enclosure.

In accordance with preferred embodiments, the present invention preferably includes a monitoring device which is able to monitor both signals from the cab and the contents of a trailer/container. According to a preferred embodiment, the monitoring device may transmit monitoring signals (i.e., RF, ultra-sonic, IR) within the trailer/container and receive responsive signals/feedback indicating the status of the container interior.

According to further preferred embodiments, the monitoring device of the present invention may preferably receive data/signals from sensors internal to the container. These sensors may include, for example, a door sensors, temperature sensors, humidity sensors and the like.

The present invention preferably includes at least a first transceiver and/or antenna system which is directed to cover (i.e., receive signals from) and monitor the status of the container interior. Additionally, the monitoring device 104 of the present invention may preferably include a second transceiver and/or antenna system which is directed to cover/monitor/receive signals from the area of the cab.

The object of the present invention is to overcome the shortcomings disclosed in the prior art. The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The following discussion addresses a number of preferred embodiments and applications of the present invention. It is to be understood that other embodiments may be utilized, and changes may be made without departing from the scope of the present invention.

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be listed in the specification and all such embodiments are intended to be included within the scope of that term or terms. As used throughout this application, the word "may" is used in a permissive sense (i.e., meaning "having the potential to"), rather than the mandatory sense (i.e. meaning "must").

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types.

FIGS. 1-12 illustrate aspects of an exemplary data sensing and processing system which may be used with example implementations of the present invention. As should be understood, the systems disclosed in FIGS. 1-12 are exemplary systems onto which the features of the present invention may be integrated. Accordingly, the figures are intended to be illustrative and any of a variety of systems may be used with the present invention without limitation.

Figure 1:
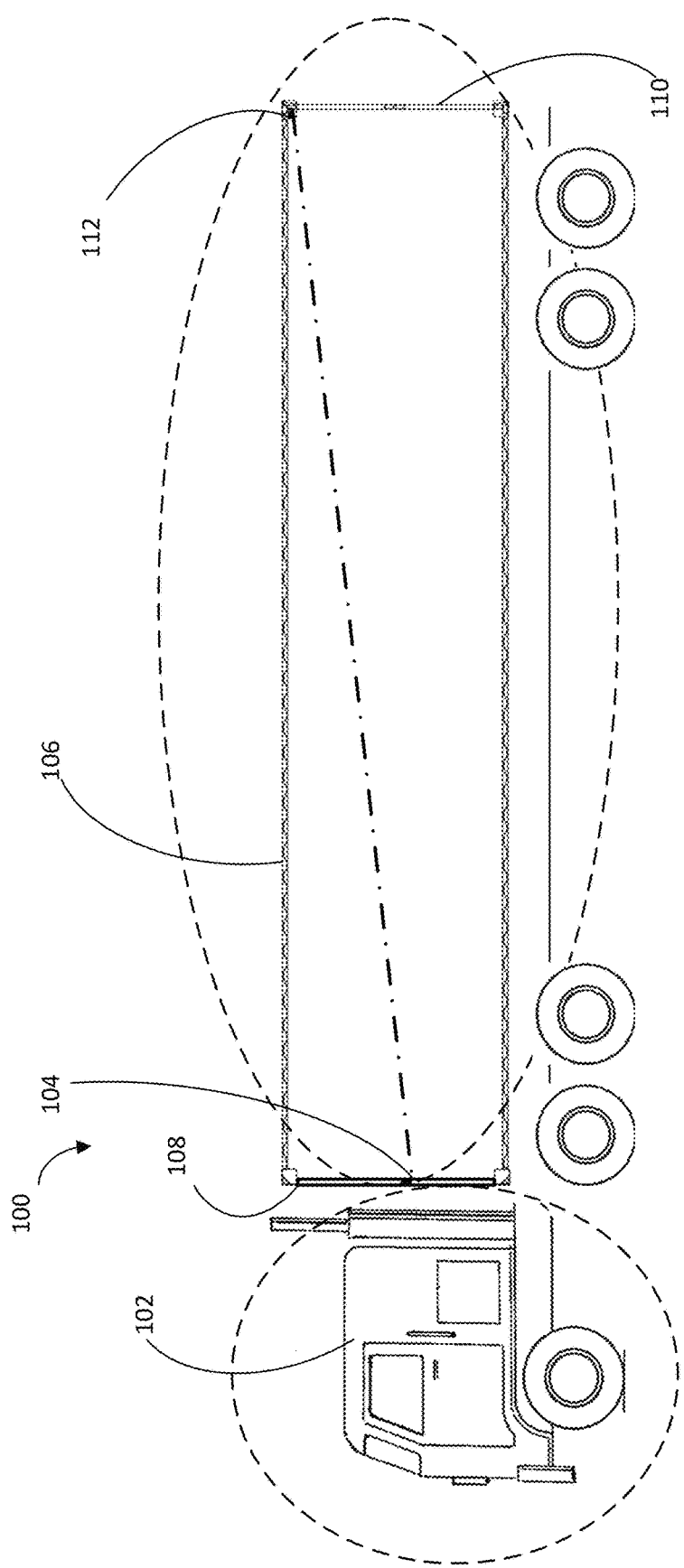
FIG. 1 shows a monitoring unit of the present invention attached to a cargo container according to a first embodiment of the present invention.

With reference now to FIG. 1, a diagram illustrating an exemplary communication system 100 of the present invention is provided. Specifically, a conventional tractor-trailer is shown including a front cab 102 (i.e., tractor unit) attached to a box trailer 106. These are provided as examples and any other type of container and/or truck arrangement may be used with the present invention without limitation. Alternatives may include any type of truck, semi-truck, refrigerated trailer, shipping container, intermodal container or the like.

As shown in FIG. 1, the present invention preferably includes a monitoring device 104 which is able to monitor both signals from the cab and the contents of a trailer/container 106. According to a preferred embodiment, the monitoring device 104 may transmit monitoring signals (i.e., RF, ultra-sonic, IR) within the trailer/container 106 and receive responsive signals/feedback indicating the status of the container interior. As shown, the container 106 may include a nose end 108 and a door end 110. Preferably, the monitoring device 104 of the present invention is preferably placed at the nose-end 108 of the trailer. Alternatively, the monitoring device 104 may be placed on any surface of the container 106.

According to preferred embodiments, the monitoring device 104 of the present invention may preferably receive data/signals from sensors internal to the container 106. These sensors 112 may include, for example, a door sensors, temperature sensors, humidity sensors and the like. As discussed further below, the monitoring device 104 of the present invention preferably includes at least a first transceiver and/or antenna system which is directed to cover (i.e., receive signals from) and monitor the status of the container interior 106. Additionally, the monitoring device 104 of the present invention may preferably include a second transceiver and/or antenna system which is directed to cover/monitor/receive signals from the area of the cab 102.

Figure 2:
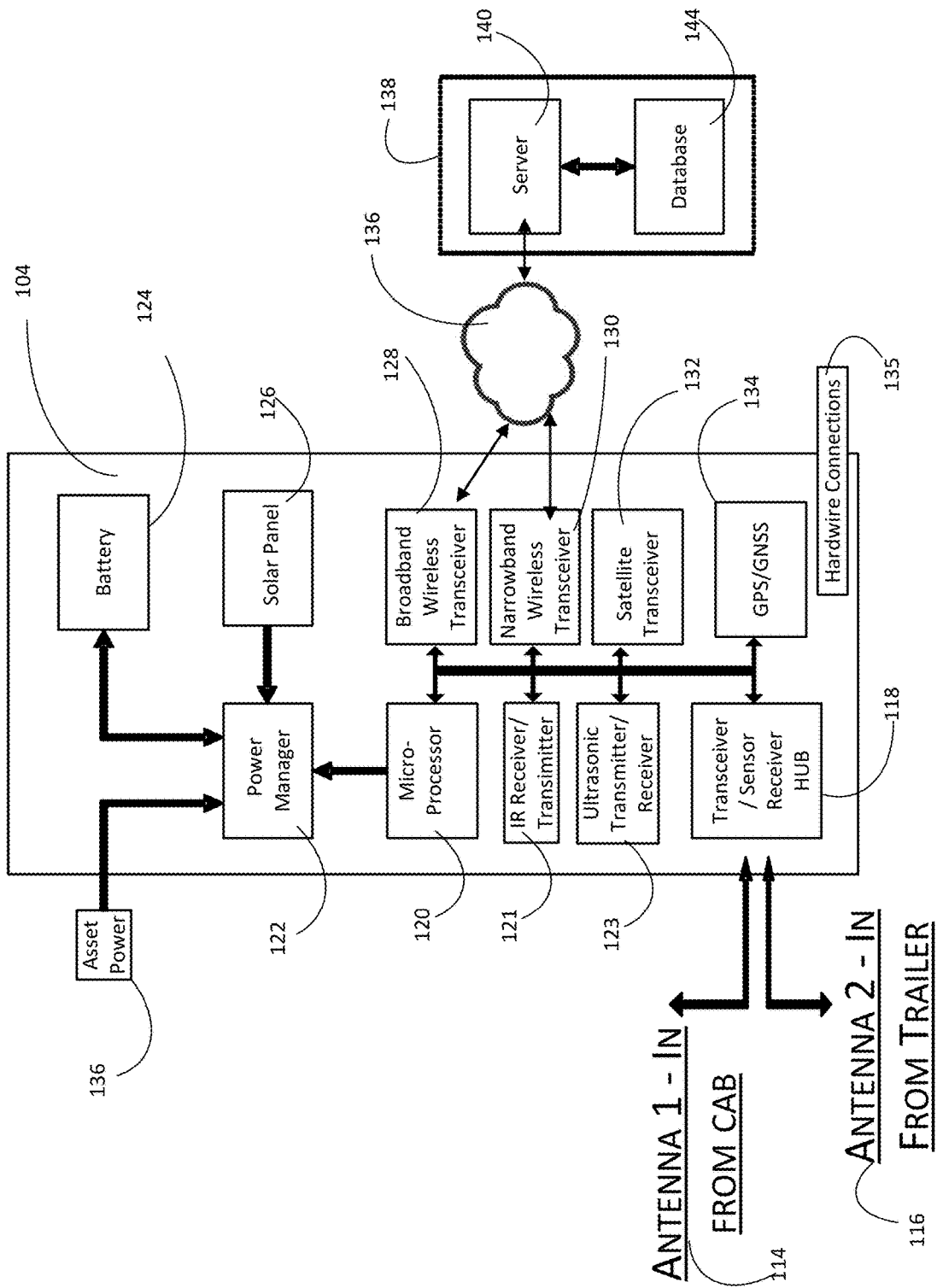
FIG. 2 is a block diagram of an exemplary control device in according with a first preferred embodiment of the present invention.

With reference now to FIG. 2, an exemplary diagram illustrating exemplary components of the monitoring device 104 of the present invention is provided. As shown, the monitoring device 104 of the present invention preferably may include a first cab antenna 114 which is preferably directed to transmit/receive monitoring data between the area of the cab 102 and the monitoring device 104. The monitoring device 104 preferably also includes a second trailer antenna 2 which preferably is directed to transmit/receive monitoring signals/data between the area of the container 106 and the monitoring device 104. As further shown, the received signals are preferably first received and processed at a transceiver hub 118. The transceiver hub 118 preferably may include one or more transceiver elements for communicating with any of a range of wireless protocols. The transceiver hub 118 preferably may include any of a mix modulators, demodulators and/or receivers for a range of protocols including (but not limited to): Bluetooth, Bluetooth Low Energy ("BLE"), ZigBee, Thread, Wi-Fi (802.11xxx), 2G-5G, LTE, NFC, RFID, and DigiMesh protocols.

According to preferred embodiment, the cab directed antenna 114 preferably may be a BLE antenna and the hub 118 may include a BLE transceiver chip for receiving BLE transmitted signals. According to a further preferred embodiment, the trailer directed antenna may also include a BLE antenna. Additionally, the monitoring device 104 may include a range of receivers/transmitters for receiving/transmitting signals to and from a range of sensors and other devices. According to a preferred embodiment, these may include an IR receiver/transmitter 121 and an ultrasonic receiver/transmitter 123 as discussed further below. The monitoring device 104 may also include additional wireless transceivers such as: broadband and/or narrowband wireless transceivers 128, 130, a satellite transceiver 132, and/or a GPS/GNSS receiver 134 or the like. As discussed further below, the trailer directed BLE antenna may preferably be arranged and configured to communicate with tags, sensors and systems attached to the trailer such as: door sensors; distributed cargo sensors, main cargo sensors; tire pressure monitoring systems, braking systems, any BLE tags located on the chassis, pallet sensors, motion sensors, load sensors and the like.

The monitoring device 104 may preferably be battery-powered via a rechargeable battery 124 or the like. Further, the monitoring device 104 may include a solar panel 126 to provide power to the device. Optionally, asset power 136 may be used when available to recharge the battery 124 and to provide power to the monitoring device 104. Preferably, power and battery management may be controlled/managed by a power manager 122 under control of a microprocessor 120. In a preferred embodiment, a single microprocessor 120 may control the operation and functions of the monitoring device 104 as discussed herein. The monitoring device 104 may preferably further communicate with remote systems via the internet, IOT cloud 136 or the like. The monitoring device 104 may further access remote data sources 138 which may include remote servers 140 and databases 144. Preferably, reporting from the container monitoring device 104 to any remote monitoring station may be made via any one of the wireless transceivers 128, 130 and 132.

In accordance with a preferred embodiment of the present invention, the satellite transceiver 132 may communicate with a satellite system. In accordance with an alternative preferred embodiment of the present invention, the reporting may also be made using a wireless system independent from the satellite system. According to this embodiment, the wireless transceivers 128, 130 may transmit signals to a wireless relay, base station or the like for routing transmissions to a chosen centralized location independent from or in combination with the transmissions made from the satellite system. According to further preferred embodiments, the container monitoring device 104 may preferably further include internal and/or external ports 135 for hardwired connections such as an RS-232 interface, FAKRA connectors and/or the like.

As referred to above, all communications of the present invention may be designed to be duplex or simplex in nature. Further, as needs require, the processes for transmitting data to and from the present invention may be designed to be push or pull in nature. Still further, each feature of the present invention may be made to be remotely activated and accessed from distant monitoring stations. Accordingly, data may be uploaded to and downloaded from the present invention as needed.

Additionally, the communications elements of the present invention may preferably include elements to communicate via the Internet, cellular communication networks, local area networks, metro area networks, wide area networks, cloud networks, conventional telephone service networks, and the like, or combinations thereof. Further, the communication elements may be wired, wireless, or combinations thereof and may include components such as modems, gateways, switches, routers, hubs, access points, repeaters, towers, and the like. Communication and control systems of the present invention may include signal or data transmitting and receiving circuits, such as antennas, amplifiers, filters, mixers, oscillators, digital signal processors (DSPs), and the like.

Figure 3:
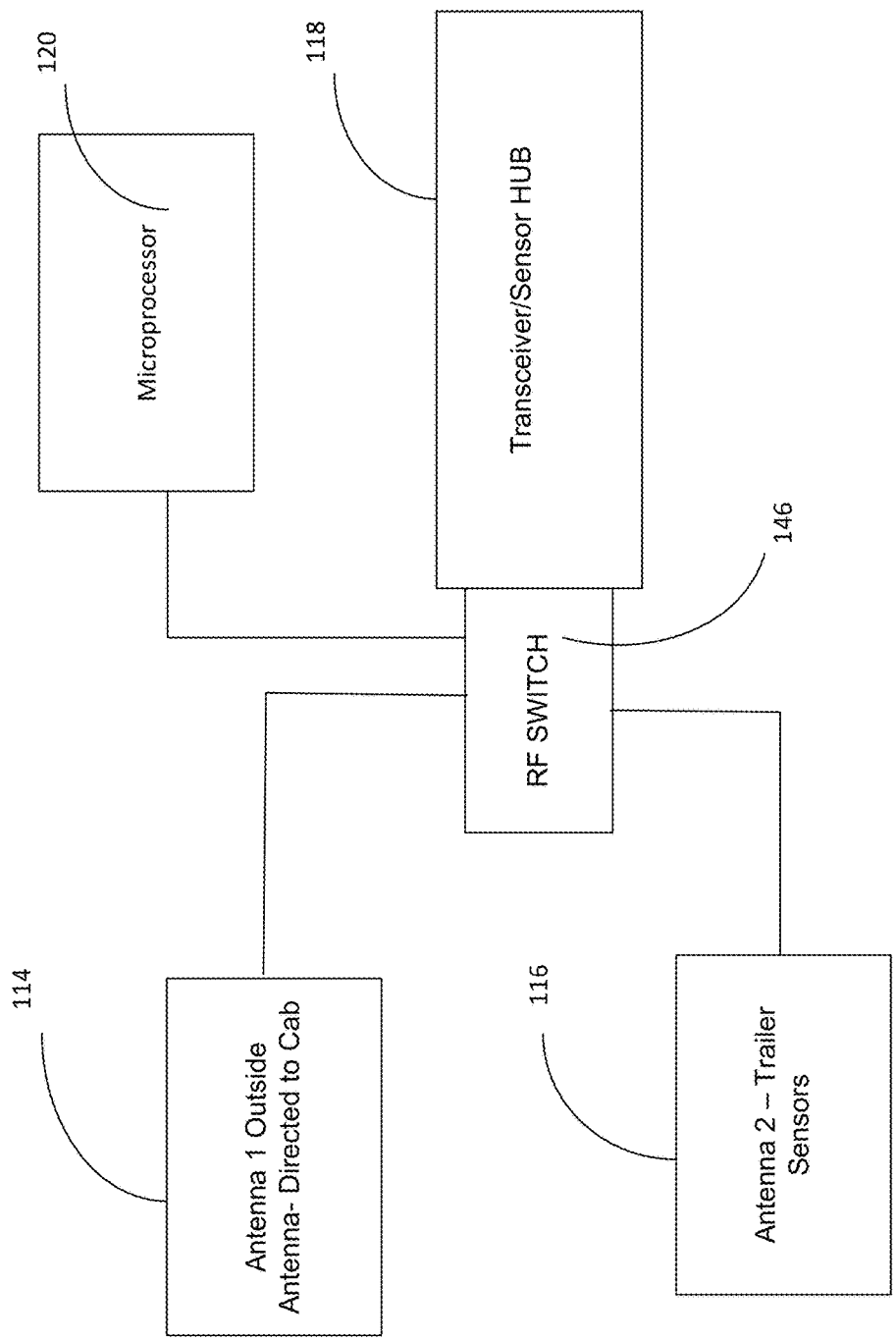
FIG. 3 is block diagram of a further detail of the exemplary control device shown in FIG. 2.

With reference now to FIG. 3, the transceiver/sensor hub 118 may preferably be linked to an RF switch 146 to control which antenna input is received by the transceiver hub 118. Preferably, the RF switch 146 may be controlled by the microcontroller 120. According to a preferred embodiment, the RF switch 146 may be controlled to toggle/switch between the cab area and the second trailer area. In this way, the system may monitor sensors in both areas via a low power protocol such as Bluetooth low energy (BLE) or using combinations of other protocols as discussed herein. According to alternative preferred embodiments, the RF switch 146 and/or the hub 118 may be formed of circuits within the microcontroller 120.

Figure 4:
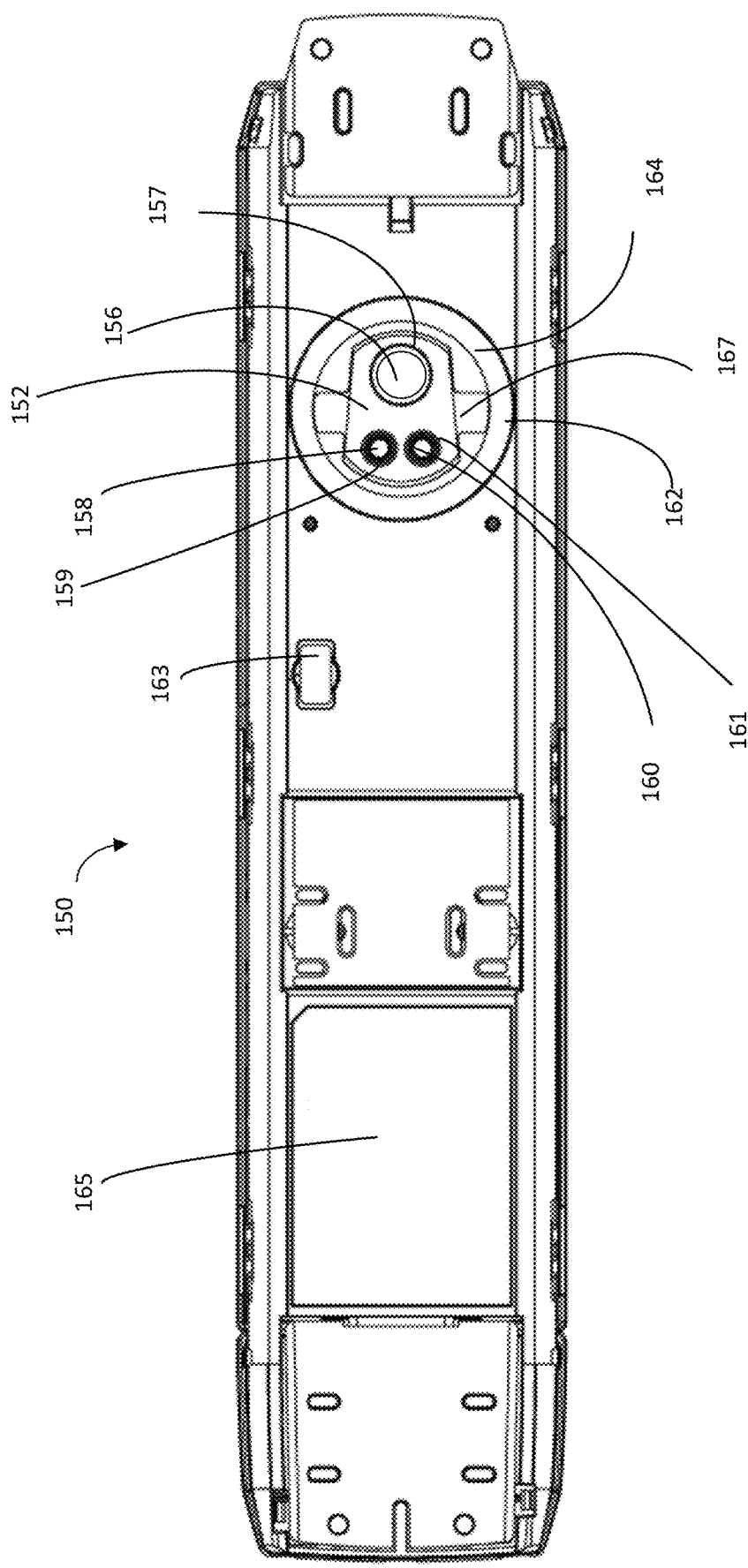
FIG. 4 is an exemplary front view of a monitoring unit according to an embodiment of the present invention.
Figure 8:
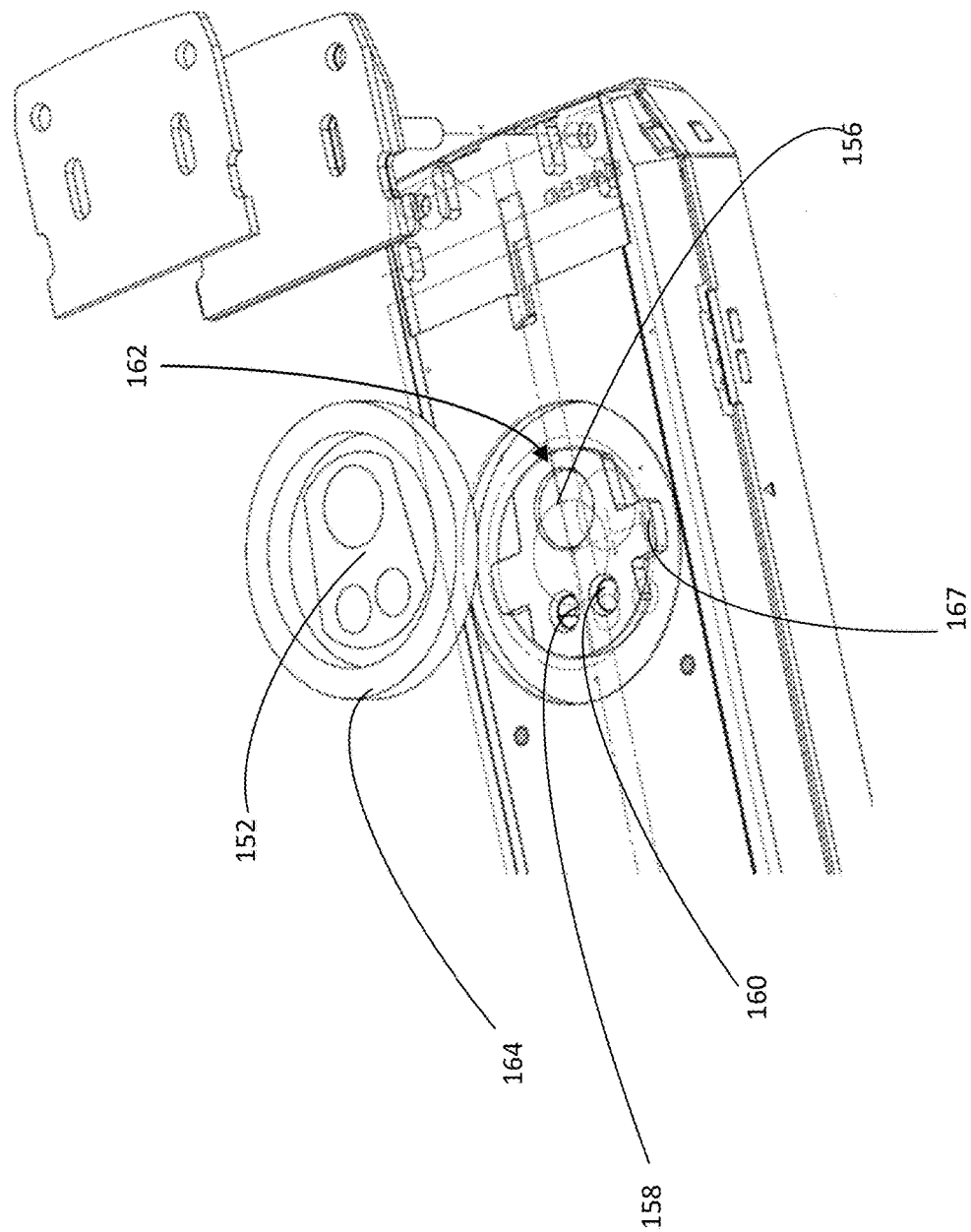
FIG. 8 is an exemplary view of an exemplary monitoring unit of the present invention.
Figure 12:
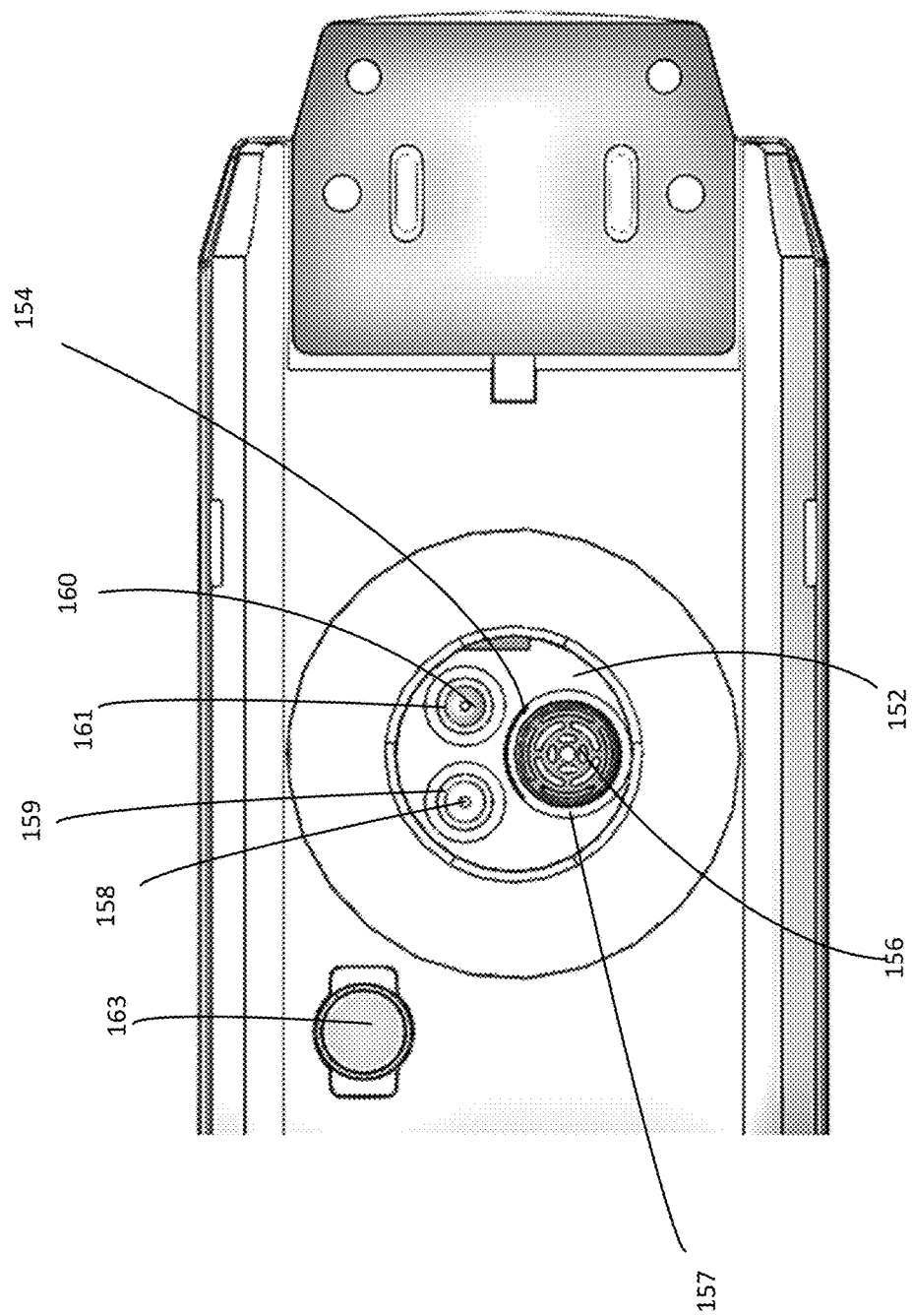
FIG. 12 is a further schematic front view of a monitoring unit according to an embodiment of the present invention.

With reference now to FIGS. 4, 8 and 12, further embodiments of an exemplary cargo monitoring device 150 will now be discussed. As shown, the container monitoring device 150 preferably may include common enclosure incorporating an ultrasonic sensor 156, an IR transmitter 158 and an IR receiver 160. Preferably, the ultrasonic sensor 156, IR transmitter 158 and IR receiver 160 are closely spaced within a common circular, framed opening 162. As shown, the circumference of the circular, framed opening 162 is preferably in contact with a sealing gasket 164 or the like. As further shown, the circular, framed opening 162 preferably may include a cross-frame supporting element 167. The cross-frame supporting element 167 may preferably laterally transverse the framed opening 162. According to alternative preferred embodiments, the cross-frame supporting element 167 may be oriented substantially parallel or perpendicular to the primary axis of the container monitoring device 150.

As discussed further below, the cross-frame supporting element 167 may preferably support a slot support surface 152. Preferably, the primary axis of the slot support surface 152 may be perpendicular or parallel to the primary axis of the container monitoring device 150. The slot support surface 152 preferably may be formed of, painted or coated with a conductive foil or paint. The conductive foil or paint may include a conductive metal such as aluminum, copper, tin or the like. As shown, the slot support surface 152 preferably includes at least a first annular slot opening 157, a second annular slot opening 159 and a third annular slot opening 161 respectively aligning with the ultrasonic sensor 156, the IR transmitter 158 and the IR receiver 160.

According to a preferred embodiment, the framed opening 162 preferably has an inner diameter of approximately 1.75 inches (~45 mm). Preferably, the sealing gasket 164 matches the framed opening 162 so that the inner diameter of the sealing gasket 164 is also approximately 1.75 inches. According to a further preferred embodiment, the slot support surface 152 preferably has a diameter of approximately 1.625 inches (~41 mm). According to alternative preferred embodiments, the approximate dimensions of each of these components 152, 162, 164 may vary by +/− 1-10%. According to a preferred embodiment, the slot support surface 152 preferably acts as a patch or floating patch. Preferably, the slot support surface 152 is recessed beneath the upper surface of the sealing gasket 164.

Figure 5:
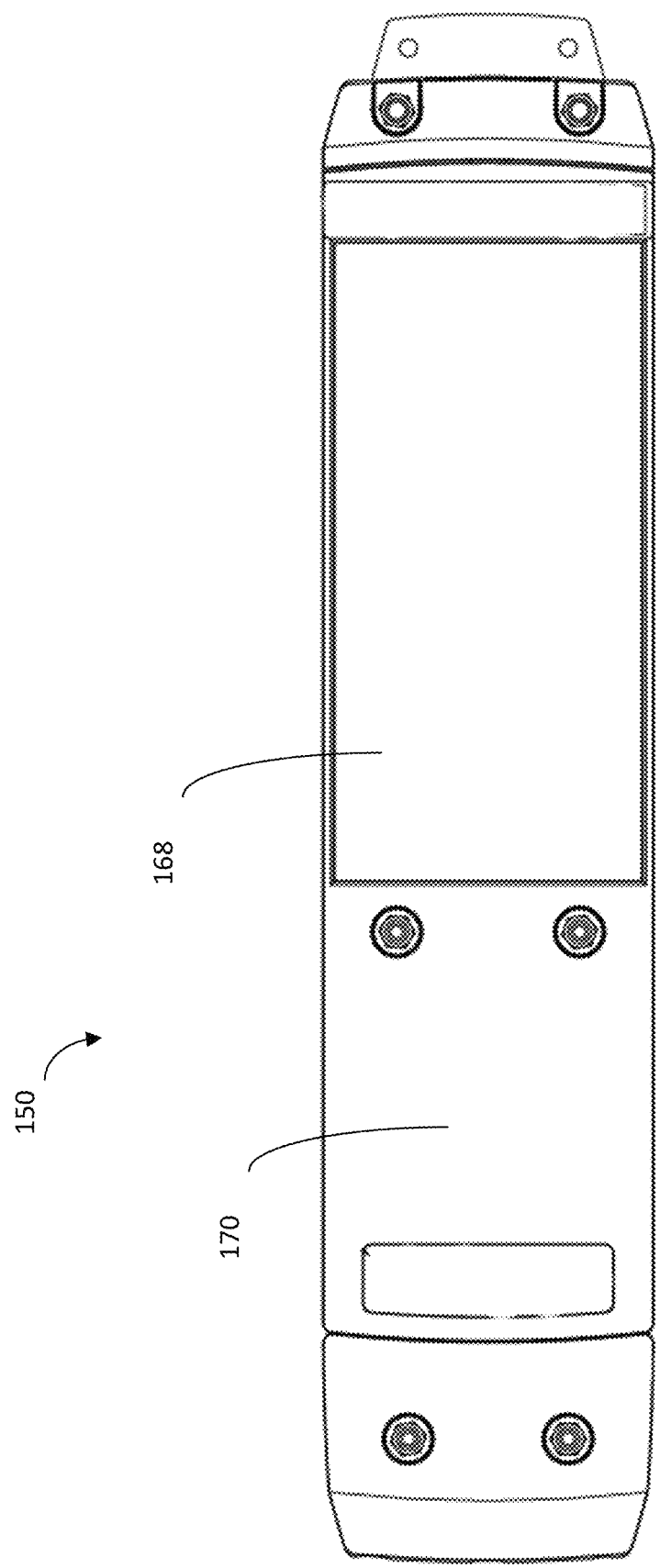
FIG. 5 is an exemplary rear view of the monitoring unit shown in FIG. 4.

As further shown in FIG. 4, the container monitoring device 150 may also include a battery 165 and a magnet 163. According to a preferred embodiment, the magnet 163 may preferably be positioned and arranged to attach to a metal surface when the container monitoring device 150 is installed on a container or the like. According to a further preferred embodiment, the magnet 163 may be adhesively (such as with a VHB overlay or the like) or magnetically attached to the container monitoring device 150 so that removal of the container monitoring device 150 from a metallic surface may cause the magnet 163 to detach from the container monitoring device 150 and trigger an alarm. Such an alarm may be triggered by a Hall Effect sensor or the like upon removal of the magnet 163 from the body of the container monitoring device 150. Such an alarm may preferably be activated and/or deactivated by the microcontroller based on signals received by the microcontroller 120. As shown in FIG. 5, the container monitoring device 150 may preferably be enclosed with a protective outer surface/shell 170. The container monitoring device 150 may preferably also include a solar panel 168 or the like to allow for powering and/or recharging of a battery (not shown).

Figure 6:
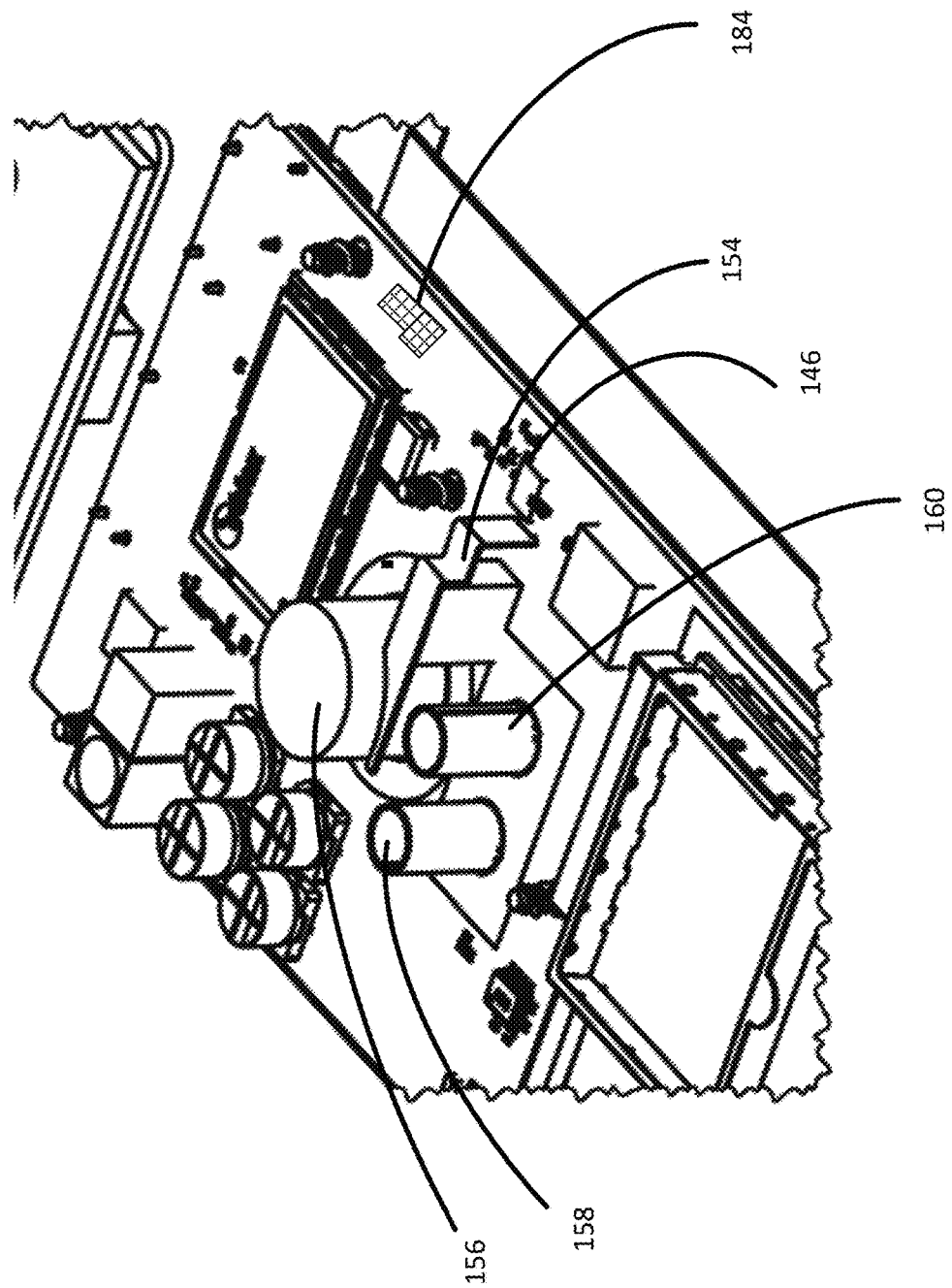
FIG. 6 is an exemplary, perspective view of an exemplary printed circuit board arrangement according to a first preferred embodiment of the present invention.
Figure 7:
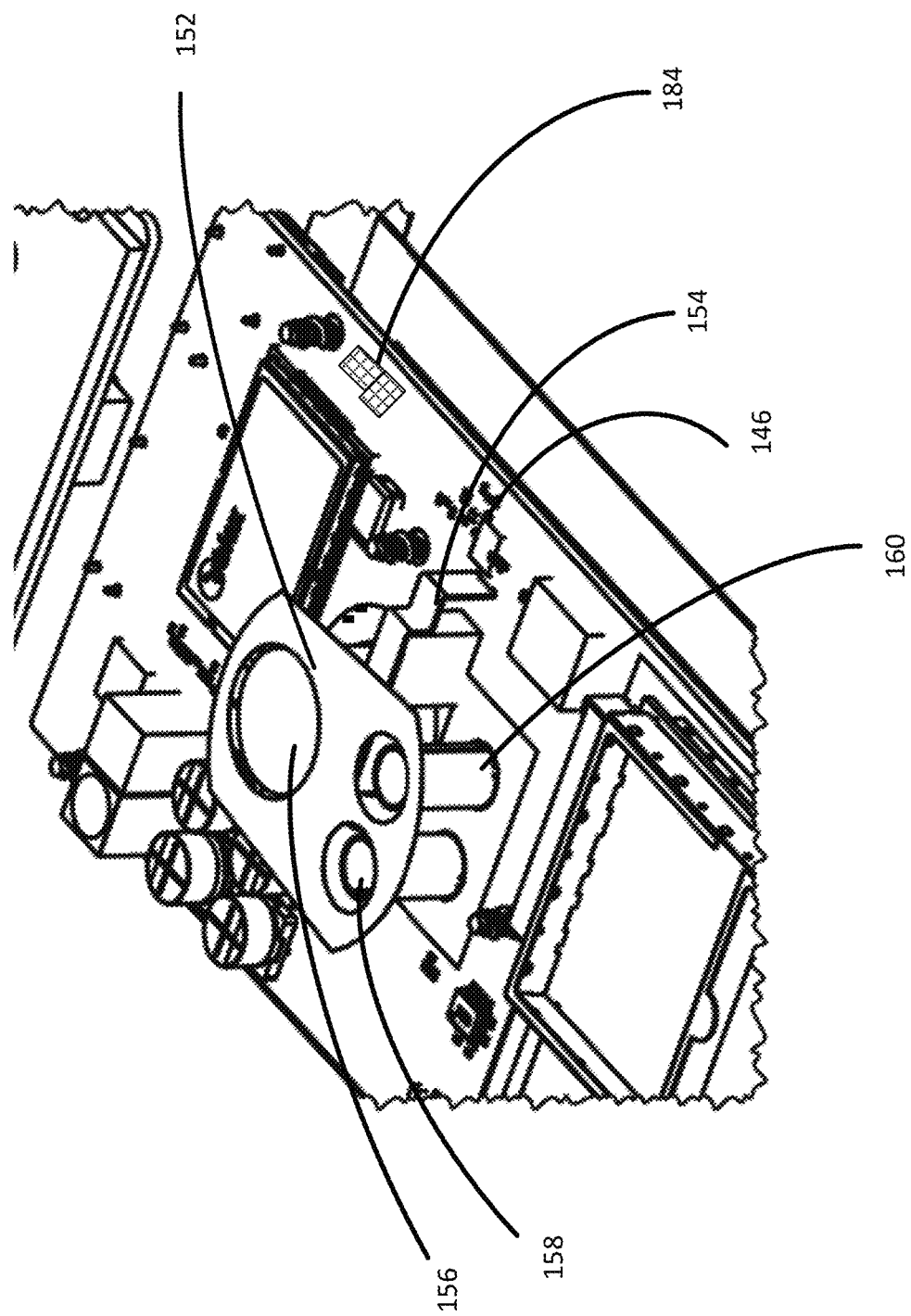
FIG. 7 is an exemplary view of the exemplary printed circuit board arrangement shown in FIG. 6 according to a further preferred embodiment of the present invention.

With reference now to FIGS. 6 and 7, a further schematic view of an exemplary printed circuit board arrangement according to a first embodiment of the present invention is provided. The ultrasonic sensor 156, IR transmitter 158 and IR receiver 160 as discussed above are shown. Additionally, an RF switch circuit 146, a trailer directed antenna 154 and a cab directed antenna 184 are shown. According to a preferred embodiment, the trailer directed antenna 154 is preferably a BLE antenna. Alternative antenna types may also be used, as discussed above with respect to Antenna 1 114 in FIG. 2. According to a further preferred embodiment, the trailer directed antenna 154 may preferably be a curved F type, BLE antenna.

As further shown in FIGS. 6 and 7, the cab directed antenna 184 may preferably be any of a variety of antennas as discussed above. According to an exemplary embodiment, the cab directed antenna may preferably be a meander line antenna, patch antenna or the like. With reference to FIG. 7, the trailer directed antenna 154 is preferably located behind the slot support surface 152. With reference to FIGS. 6 and 7, the trailer directed antenna 154 is preferably a curved, F type antenna which includes a curve which generally matches the curve and/or profile of the ultrasonic sensor 156. According to a preferred embodiment, the trailer directed antenna 154 is preferably positioned adjacent to the ultrasonic sensor 156 so that the curve of the antenna 154 extends over the ultrasonic sensor 156. According to a further preferred embodiment, the trailer directed antenna 154 is preferably position, sized and curved so that at least a portion of the trailer directed antenna 154 extends within the circumference of the first annular slot opening 157 along with the ultrasonic sensor 156 as shown in FIG. 12.

Figure 9A:
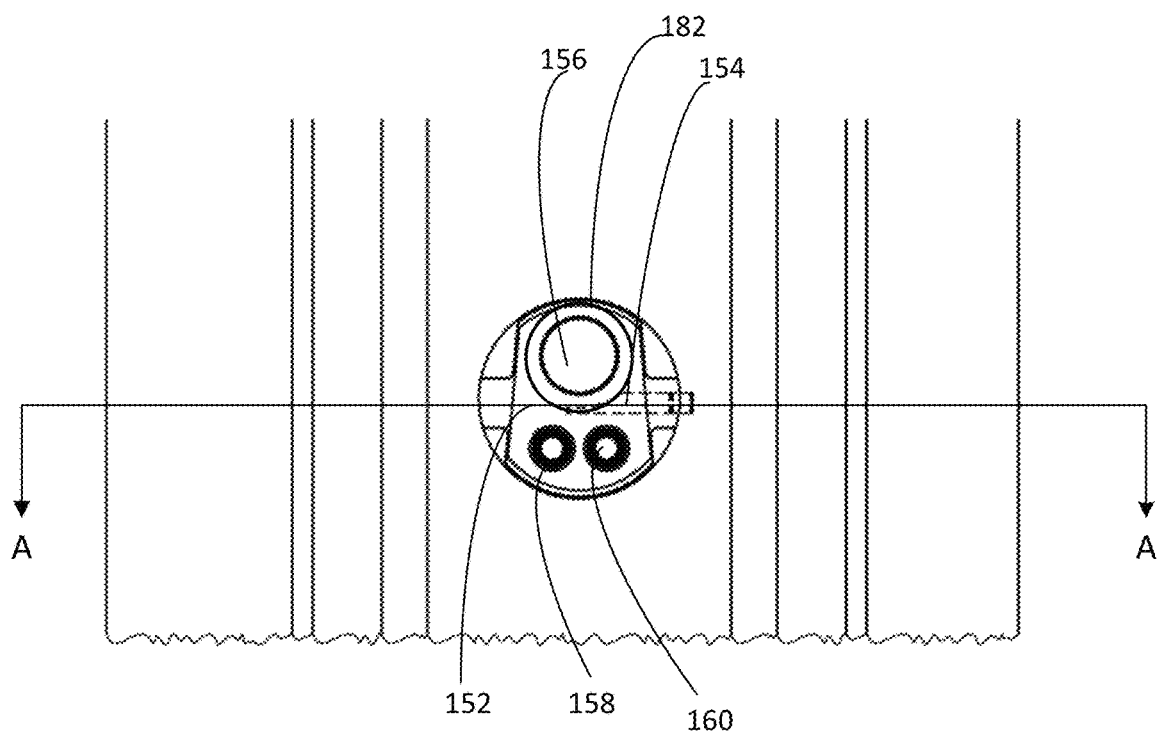
FIG. 9A is a view of an exemplary monitoring unit of the present invention from within a closed container.
Figure 9B:
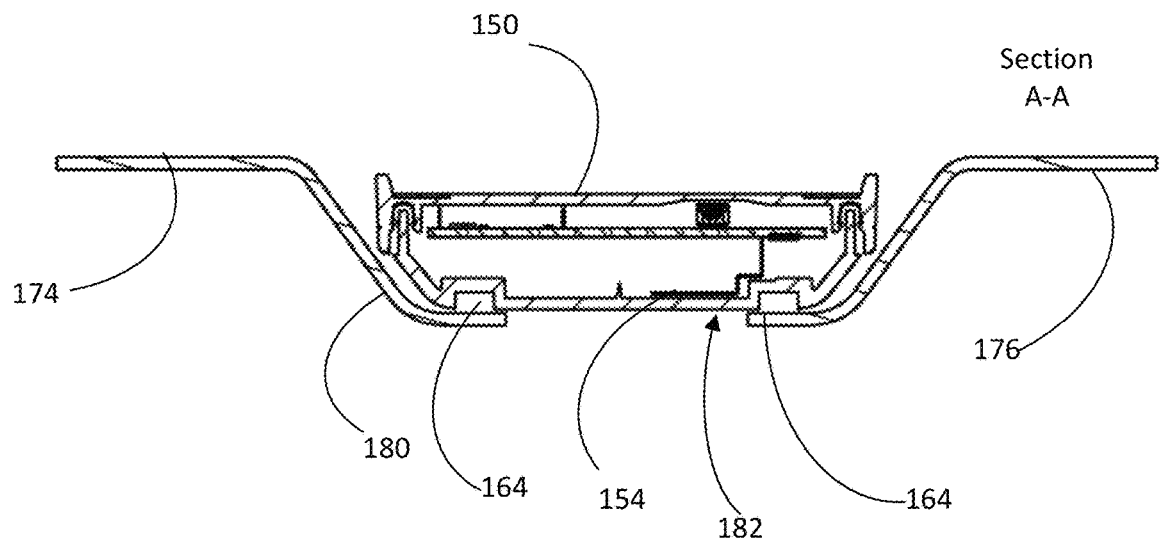
FIG. 9B is a cross-sectional view of the monitoring unit shown in FIG. 9A taken along the line A-A.

With reference now to FIG. 9A, a view of the container monitoring device 150 of the present invention from within a closed container is provided. As shown, the container monitoring device 150 of the present invention is visible through a hole 182 in the wall of corrugated container. Preferably, the circular, framed opening 162 (not shown) of the container monitoring device 150 is aligned to match the hole 182 within the wall of the corrugated container. In this way, the ultrasonic sensor 156, IR transmitter 158 and IR receiver 160 each preferably have an unshielded path through the slot support surface 152 and the container wall into the container interior. Further, as discussed above, the trailer focused antenna 154 preferably also has an unshielded path due to its fitted, curved alignment with the ultrasonic sensor 156. With reference to FIG. 9B, a cross-sectional view of the monitoring unit 150 taken along the line A-A is provided. As shown, the sealing gasket 164 of the container monitoring device 150 preferably is aligned with the hole 182 of the container wall so that at least a partially airtight seal is formed.

Figure 10:
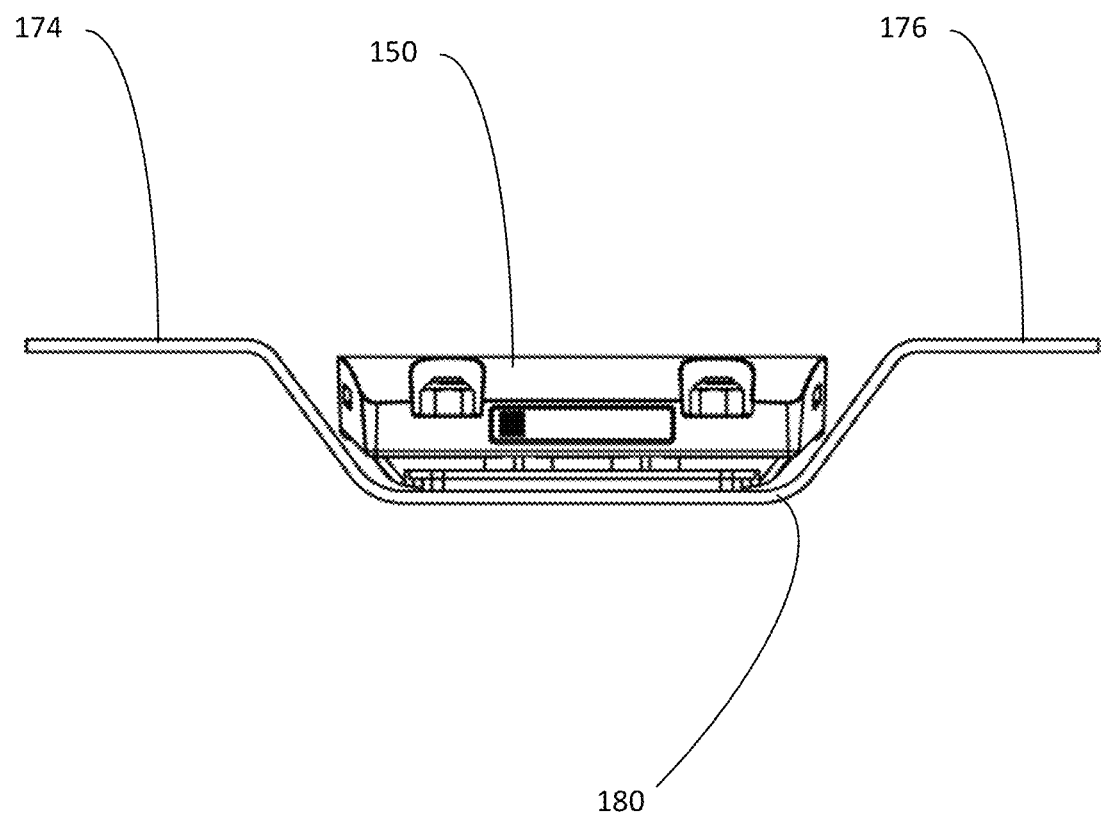
FIG. 10 is a side view of an exemplary monitoring unit of the present invention attached within the corrugation of a shipping container.
Figure 11:
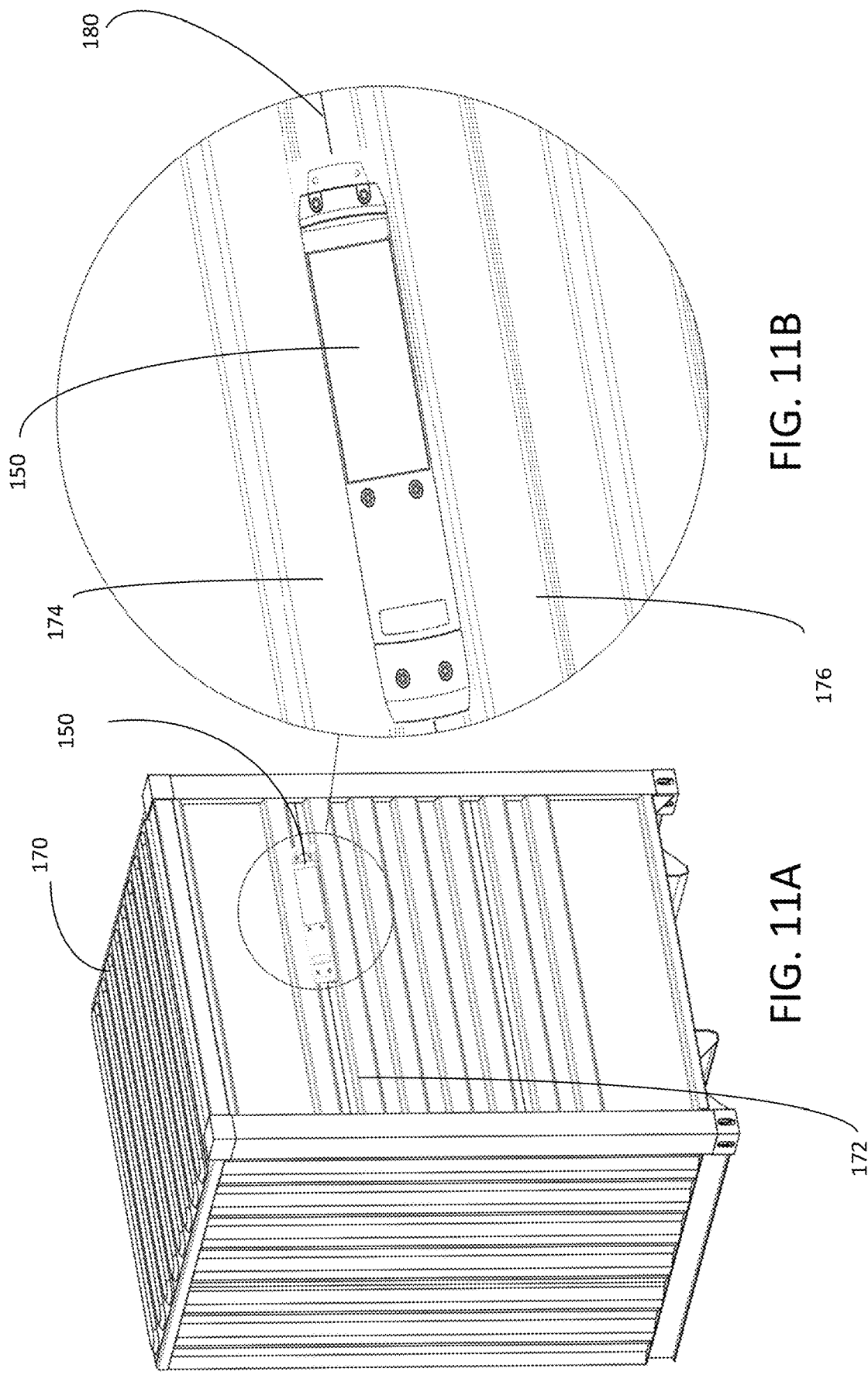
FIG. 11A is an illustration of an exemplary cargo container monitoring unit of the present invention attached to a shipping container.
FIG. 11B is an enlarged view of the cargo container monitoring unit shown in FIG. 9A.

With reference now to FIGS. 10, 11A and 11B, side and perspective views are provided showing an exemplary container monitoring unit 150 of the present invention attached to the corrugated surface 172 of a shipping container 170. As shown, the container monitoring device 150 preferably is sized and configured to be attached between two raised surfaces 174, 176 of the corrugated surface 172 and within a recessed channel 180 of the corrugate surface 172. As shown in FIG. 10, the profile, width and thickness of the container monitoring device 150 preferably conforms to the dimensions of a selected corrugated surface such that the entire body of the container monitoring device 150 sits flush with or below the height of the adjacent raised surfaces 174, 176.

Figures 13A, 13B:
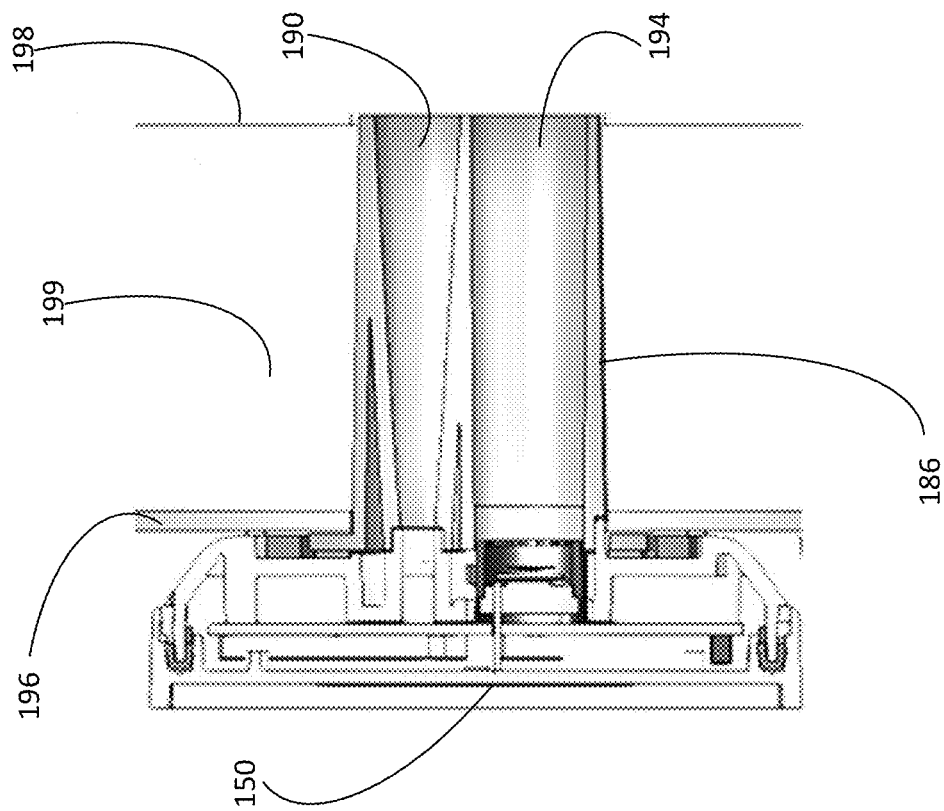
FIGS. 13A and 13B illustrate an extension tube in accordance with a first preferred embodiment of the present invention.

With reference now to FIGS. 13A and 13B, a further aspect of the present invention may preferably include an extension tube 186 which may be used with the container monitoring device 150 of the present invention. As shown, the extension tube 186 may preferably include an outer flange 196 and a central extension section 188. As shown, the central extension section 188 may preferably include hollow channels 190, 192, 194 for guiding signals to and from the ultrasonic sensor 156, IR transmitter 158 and IR receiver 160. As shown in FIG. 13B, the extension tube 186 may preferably be used where the exterior wall 196 of a container is separated from the interior wall 198 of the container by given distance 199. As shown, to overcome this distance 199, the container monitoring device 150 of the present invention may preferably be aligned with the extension tube 186 so that each of the respective channels 194, 190, 192 aligns with the ultrasonic sensor 156, IR transmitter 158 or IR receiver 160.

Figure 14:
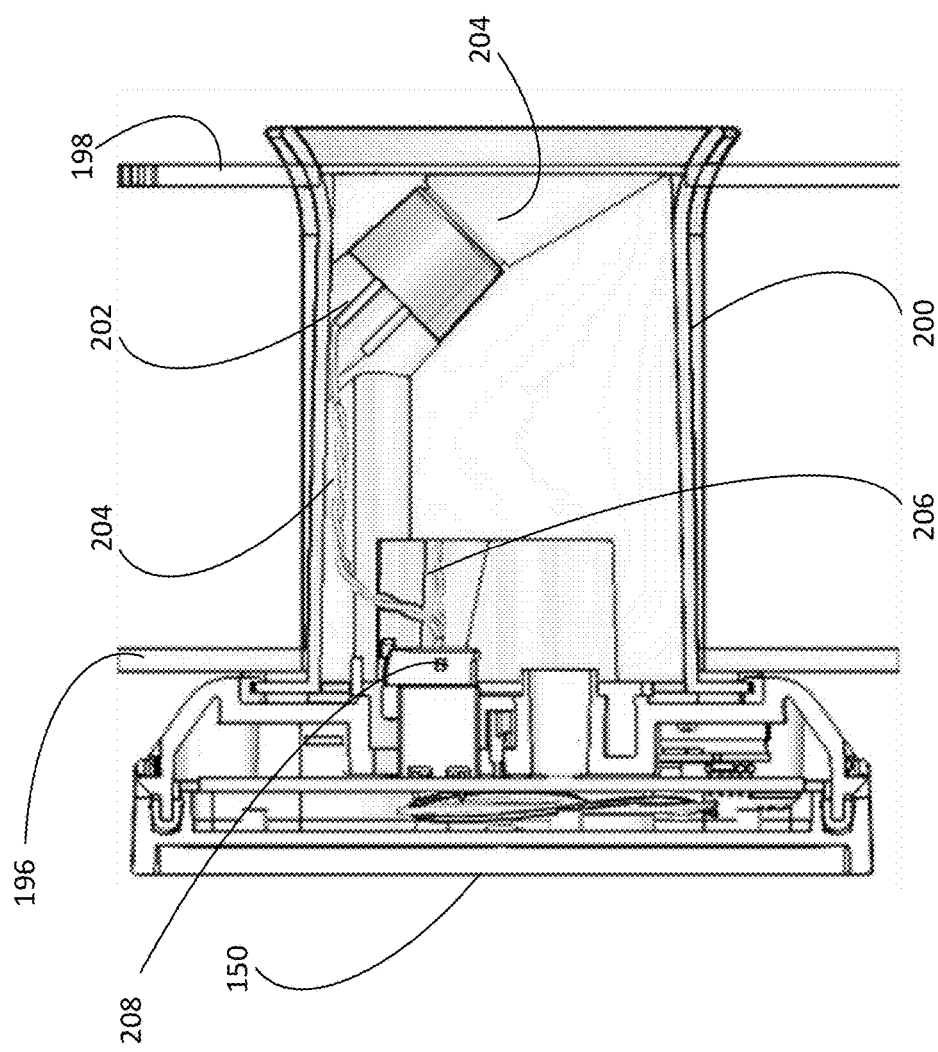
FIG. 14 illustrates an alternative extension tube design.

With reference to FIG. 14, an alternative extension tube 200 may also be used. As shown, the alternative extension tube 200 may include a wire-to-board connector 208 (or the like) attached to extension wires 204, 206 which are connected to an ultrasonic sensor 202, IR transmitter (not shown) and IR receiver (not shown) which are attached to the opposite, extended end of the alternative extension tube 200. Further, the alternative extension tube 200 may include channels 204 which may preferably assist to guide signals to and from the ultrasonic sensor 156, IR transmitter 158 and IR receiver 160. The present invention has been disclosed above with reference to several examples. These examples are not intended to be limiting. Instead, the scope of the present invention should be determined purely by the terms of the appended claims and their legal equivalents.

What is claimed is:

1. A monitoring device for monitoring an area of a cab and a container interior, the monitoring device comprising:
    a device housing; wherein the device housing comprises an outer surface and an inner surface; wherein the inner surface comprises a first opening having a first outer circumference;
    a first trailer antenna, wherein the first trailer antenna is directed to transmit and receive data to and from the container interior;
    a second cab antenna, wherein the second cab antenna is directed to transmit and receive data to and from the cab;
    a transceiver hub, wherein the transceiver hub is configured to receive and process data received from the first trailer antenna via a first antenna input; wherein the transceiver hub is configured to receive and process data received from the second cab antenna via a second antenna input; wherein the transceiver hub comprises a BLE transceiver chip for receiving BLE transmitted signals;
    an RF switch, wherein the RF switch comprises an RF switch microcontroller; wherein the RF switch microcontroller is configured to control which antenna input is received and processed by the transceiver hub; wherein the RF switch microcontroller is configured to switch between the first antenna input and the second antenna input to selectively monitor a first group of sensors within the cab and a second group of sensors within the trailer;
    an ultrasonic sensor;
    an IR transmitter; and
    an IR receiver; wherein at least a portion of the ultrasonic sensor, the IR transmitter and the IR receiver are positioned within the first outer circumference.

2. The monitoring device of claim 1, wherein the monitoring device further comprises a cross-frame supporting element; wherein the cross-frame supporting element is positioned within the first outer circumference; wherein the cross-frame supporting element is oriented substantially perpendicular to a primary axis of the container monitoring device.

3. The monitoring device of claim 2, wherein the monitoring device further comprises a slot support surface; wherein the slot support surface is supported by the cross-frame supporting element; wherein the slot support surface comprises a conductive surface; wherein the conductive surface comprises a conductive metal; wherein the conductive metal is selected from the group of metals comprising: aluminum, copper and tin;
    wherein the slot support surface comprises a first annular slot opening, a second annular slot opening and a third annular slot opening; wherein the first annular slot opening aligns with the ultrasonic sensor; wherein the second annular slot opening aligns with the IR transmitter; and wherein the third annular slot opening aligns with the IR receiver.

4. The monitoring device of claim 3, wherein the monitoring device further comprises a sealing gasket; wherein the sealing gasket extends around the first outer circumference of the first opening; wherein the slot support surface is recessed beneath the upper surface of the sealing gasket.

5. The monitoring device of claim 4, wherein the slot support surface comprises a patch antenna.

6. The monitoring device of claim 5, wherein the transceiver hub comprises a Bluetooth low energy (BLE) transceiver.

7. The monitoring device of claim 6, wherein the monitoring device further comprises a battery and a magnet; wherein the magnet is configured to attach to a metal surface when the container monitoring device is installed on a container.

8. The monitoring device of claim 7, wherein the monitoring device further comprises a Hall Effect sensor; wherein the Hall Effect sensor is configured to trigger an alarm when the magnet is detached from the monitoring device.

9. The monitoring device of claim 8, wherein the monitoring device further comprises a solar panel; wherein the solar panel is located on the outer surface of the device housing.

10. The monitoring device of claim 9, wherein the first trailer antenna is a BLE antenna.

11. The monitoring device of claim 10, wherein the first trailer antenna is a curved F type antenna.

12. The monitoring device of claim 11, wherein the first trailer antenna is located behind the slot support surface.

13. The monitoring device of claim 12, wherein the first trailer antenna comprises a curved section; wherein the first trailer antenna is positioned adjacent to the ultrasonic sensor so that the curve section of the first trailer antenna extends over the ultrasonic sensor.

14. The monitoring device of claim 13, wherein the first trailer directed antenna is positioned so that at least a portion of the first trailer antenna extends within the circumference of the first annular slot opening along with the ultrasonic sensor.

* * * * *